C. W. DAVIS.
GRAIN DRILL.
APPLICATION FILED DEC. 19, 1912.
1,082,072.
Patented Dec. 23, 1913.
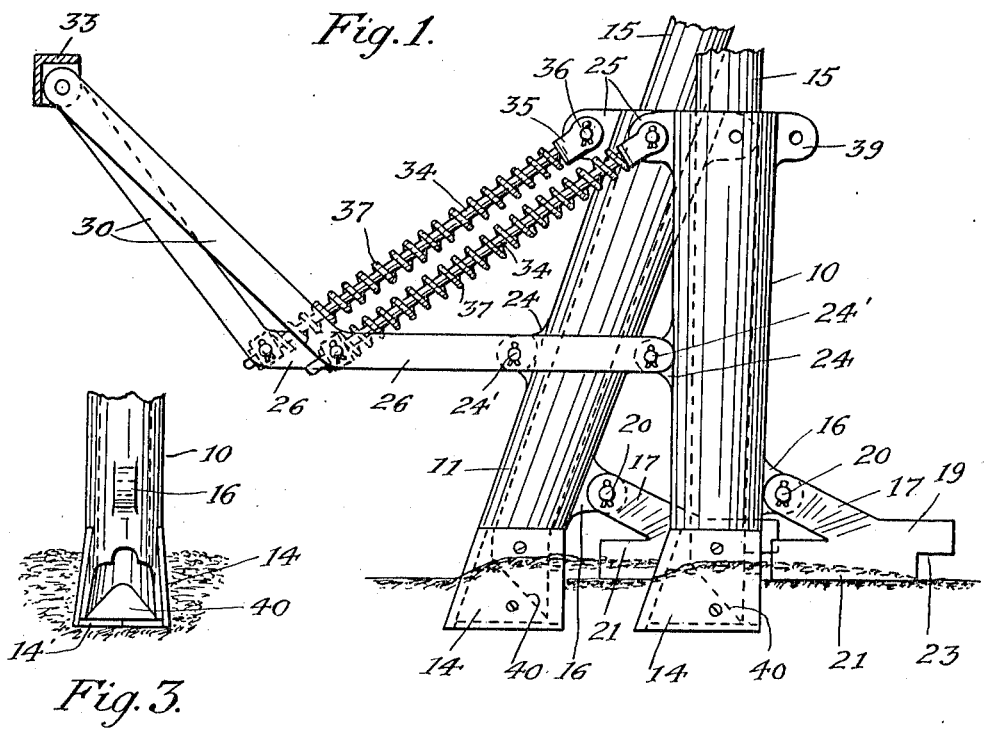
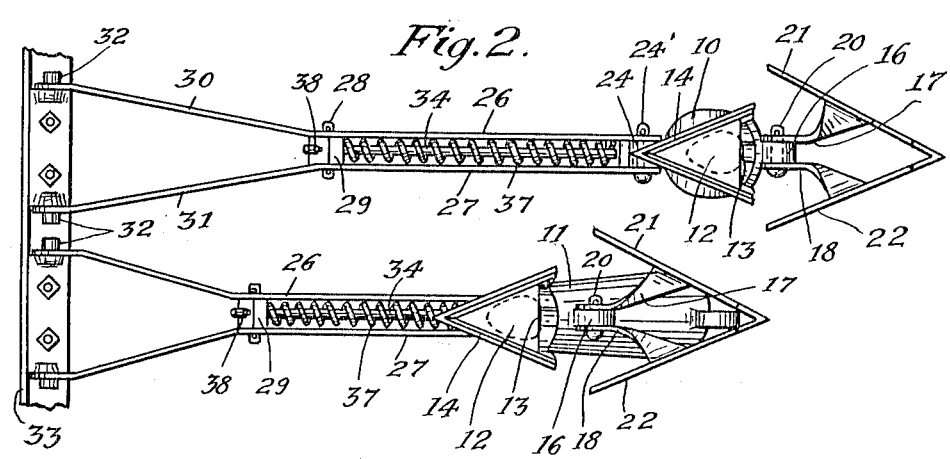
Witnesses:
Inventor:
Curtis W. Davis.
By his Attorney.

UNITED STATES PATENT OFFICE.

CURTIS W. DAVIS, OF DONALDSON, MINNESOTA.

GRAIN-DRILL.

1,082,072.   Specification of Letters Patent.   Patented Dec. 23, 1913.

Application filed December 19, 1912. Serial No. 737,648.

*To all whom it may concern:*

Be it known that I, CURTIS W. DAVIS, a citizen of the United States, residing at Donaldson, in the county of Kittson and State of Minnesota, have invented certain new and useful Improvements in Grain-Drills, of which the following is a specification.

My invention relates to grain drills and has for its object to provide a drill having a furrower and coverer such that the grain will be spread over a considerable width at the bottom of the drill furrow, instead of being dropped in a narrow line as is now the case. I also provide a coverer which acts positively and efficiently to draw the soil back and lay the same smoothly in the furrow after the grain has been set therein.

The full objects and advantages of my invention will appear in connection with the detailed description thereof and are particularly pointed out in the claims.

In the drawings illustrating the application of my invention in one form: Figure 1 is a side elevation of a portion of a drill showing my improvements connected therewith. Fig. 2 is a plan view from beneath of the parts shown in Fig. 1. Fig. 3 is a rear view of the lower portion of one of the furrowers.

In the practice of my invention members 10 and 11 are provided with openings 12 through the centers thereof, said openings being adjacent the bottom with expanded rear portions 13 as shown in Fig. 2. The hollow members 10 and 11 differ in character only from the fact that 10 has the connection with other parts thereof so formed as to be drawn in vertical position, while 11 will be drawn in a position oblique to 10 so as to advance the furrower carried thereby a sufficient distance to permit proper operation of the spreading feature. It is understood that two separate rows of members 10 and 11 will be provided across the drill, members 11 being drawn in advance of members 10 as indicated in Figs. 1 and 2. Upon the bottom of the tubular members 10 and 11 is secured a steel shoe 14, V-shaped in cross section and having the wings thereof spreading obliquely so as to push the earth back at the point of seeding in the drill row to such an extent as to form a flat furrow bottom from one to three inches in width, as best shown at 14' in Fig. 3, upon which the seed fed through tubes 15 in the usual way will be caused to scatter quite uniformly. Each of the furrow-forming members 10 and 11 has formed at the back thereof adjacent shoe 14 a lug 16. Upon either side of lug 16, arms 17 and 18 of a coverer 19 are pivotally connected by means of a bolt 20. The coverer 19 is provided with a pair of cover plates 21 and 22, said plates extending obliquely with respect to one another so the lower edges of the same will run horizontally upon the ground, the plates being offset from the main frame 19, as indicated at 23, and the arms 17 and 18 flaring outwardly, as best shown in Fig. 2, to prevent clogging.

Upon the front of the furrow members 10 and 11 are formed lugs 24 at the center and lugs 25 at the top. On either side of lugs 24 are pivotally secured by bolts 24', bars 26 and 27, said bars being secured by a bolt 28 upon a spacer 29, so that between the lug 24 and spacer 29 the bars are parallel. The bars 26 and 27 are thereafter provided with upwardly and outwardly flaring portions 30 and 31, which are pivotally secured by means of pins 32 to a transverse drawbar 33. The spacer blocks 29 are each formed with an aperture through which extends the free end of a bolt 34, the other end of said bolt extending into a shouldered head 35 which is pivotally secured by bolt 36 to lug 25 at the top of furrowers 10 or 11. A strong, spiral spring 37 surrounds bolt 34 and the ends of said spring engage the shoulder on head 35 and the spacer block 29 operating to force outward the bolt 34 to the maximum permitted by a key 38 in the end of said bolt which holds the furrow openers 10 or 11 in position so that the shoes 14 at the bottom thereof have their lower edges horizontal and at the desired depth in the ground. Lugs 39 upon the upper rear portions of members 10 and 11 are provided, by which said members are connected to the usual means for lifting the same from contact with the ground (not shown).

The above structures it will be seen give great flexibility to the furrow opener. If the shoe 14 should strike a rock, stump, or other obstruction it may oscillate upon pivot 24', the bolt 34 being pushed through the pivotally secured spacer block 29 while the spring 27 is compressed, said spring immediately operating to throw the furrow opener back into operative position when the obstruction is passed. Also the pivotal connection to the bar 33 is such that each individual shoe has freedom for independent oscillation upon pivots 32 and yet is held against lateral movements by the spread of arms 30. The shoes 14 run with the bottoms horizontal and the sharp apices plowing through the ground and spreading a furrow having a perfectly flat bottom of the maximum width between the most separated portions of the shoe at the point where the seed is scattered in the furrow. The covering wings 21 and 22 of follower 19 receive the earth thrown to each side by the shoe 14 and throw the same back into the furrow so that after the same is rolled the wide drill of seed will be uniformly and satisfactorily covered. The follower 19 being pivoted upon the bolt 20 is free to oscillate in a vertical plane and to pass over obstructions, but will always receive upon the inner sides of its cover blades 21 and 22 the earth turned up at each side of shoe 14, so that uniform covering is assured. The offset relation of alternate furrow openers 10 and 11 is made desirable, and practically necessary, by reason of the wide spread of the shoes 14 and consequent width of each drill. In practice a drill employing my invention will not need to have so many independent furrow openers and drills as is the case where the seed is laid in a V-shaped furrow. Moreover a much larger proportion of the ground will be planted to separate seeds with the use of the same amount of seed than is possible with such narrow furrow opening devices.

To insure uniform spreading of the grain along the flat-bottom of the furrow formed by the furrower 14 I may employ a plate 40 extending obliquely beneath the opening in tubular members 10 or 11 from the front thereof to a point adjacent the widest spread of the blades of the furrower 14. The grain coming from the tubes 15 and falling through the opening in tubular members 10 and 11 will strike upon the plate 40 and be scattered and spread thereby so that the grain will be distributed uniformly across the width of the bottom of the furrow.

I claim:

1. A seed drill comprising a tubular member having a furrow opener at the bottom thereof, said furrow opener consisting of spreading wings with bottom edges in a common plane, a link pivotally connected to the tubular member at a point near the center thereof, a second link pivotally connected to the top of said member and slidably connected with said first named link and having means thereon for restraining said sliding movement in one direction, and a spring operating to force said last named link and the tubular member connected therewith backward to the extent permitted by said restraining means.

2. A seed drill comprising a tubular member having a furrow opener at the bottom thereof, said furrow opener consisting of spreading wings with bottom edges in a common plane, a lug centrally positioned on said tubular member, a drawbar approximately in the plane of the top of the tubular member, a pair of links pivotally connected to said lug and to said draw-bar, said links being formed with respectively horizontal and upwardly turned portions, a spacing block between said pair of links, a bolt pivotally connected to the top of the tubular member and having the end thereof extending through said spacing block, and a spring surrounding the bolt and engaging the spacing block.

In testimony whereof I affix my signature in presence of two witnesses.

CURTIS W. DAVIS.

Witnesses:
 F. A. WHITELEY,
 G. A. STOCKLAND.

---

Copies of this patent may be obtained for five cents each, by addressing the "Commissioner of Patents, Washington, D. C."